United States Patent [19]

Yamamoto

[11] 4,448,460

[45] May 15, 1984

[54] HYDROSTATIC BEARING

[75] Inventor: Hironori Yamamoto, Yokohama, Japan

[73] Assignee: Canon Kabushiki Kaisha, Tokyo, Japan

[21] Appl. No.: 474,736

[22] Filed: Mar. 17, 1983

Related U.S. Application Data

[63] Continuation of Ser. No. 160,173, Jun. 17, 1980, abandoned.

[30] Foreign Application Priority Data

Jun. 26, 1979 [JP] Japan .................................. 54-80307

[51] Int. Cl.³ ............................................. F16C 32/06
[52] U.S. Cl. ................................................. 308/5 R
[58] Field of Search ............... 308/5 R, 3 A; 384/123, 384/121, 122, 112

[56] References Cited

U.S. PATENT DOCUMENTS 3,376,083  4/1968  Muijderman .
4,099,802  7/1978  Heinemann et al. .
4,114,959  9/1978  Christ .................... 308/5 R
4,252,381  2/1981  Kimmelaar ............... 308/3 A

OTHER PUBLICATIONS

German Publication.

Primary Examiner—Lenard A. Footland
Attorney, Agent, or Firm—Fitzpatrick, Cella, Harper & Scinto

[57] ABSTRACT

A hydrostatic bearing having an increased load capacity and rigidity as compared with conventional hydrostatic bearings. To increase its load capacity and rigidity, the hydrostatic bearing of this application has peripheral air supply holes substantially on the same circumference centered at a central air supply hole provided centrally of a recess.

2 Claims, 15 Drawing Figures

HYDROSTATIC BEARING

This application is a continuation of application Ser. No. 160,173 filed June 17, 1980, now abandoned.

BACKGROUND OF THE INVENTION

1. Field of the Invention

This invention relates to a bearing member, and more particularly to a hydrostatic bearing using a fluid such as air or oil for the lubrication between two surfaces moving relative to each other.

2. Description of the Prior Art

Heretofore, hydrostatic bearings using air or oil have often been employed in slide type measurers or the feed mechanisms of machine tools. The reason is that as compared with the contact type bearing in which rollers or metals directly contact each other, the hydrostatic bearings are not in contact with support members, have little friction, operate smoothly and have enhanced accuracy. However, as compared with the contact type bearings, the hydrostatic bearings have disadvantages in they are low in load resistance and that particularly when they use compressive fluid such as air or the like, they become unstable if the gap between the hydrostatic bearings and the surface of the support member opposed thereto is larger and thus, they are liable to cause the so-called self-excited vibration which is fractional up and down movement of the bearings.

The disadvantages peculiar to the prior art will be described in greater detail with reference to the accompanying drawings which illustrate the principle. FIGS. 1 to 3 show examples of the well-known hydrostatic bearing. In the following description, air is taken as an example of the fluid and a circular pad-like bearing is taken as an example of the hydrostatic bearing.

FIG. 1 is a cross-sectional view of a circular pad-like hydrostatic bearing 1 in which air is throttled at the inlet. In FIG. 1, air pressurized to any desired pressure Po is supplied to an admission port 2, and then the flow rate of the air is limited by an orifice (air supply hole) 3, whereafter the air is injected outwardly of the bearing through a gap 5 between the fluid bearing pad 1 and a support member 4 which is set to the order of several μm. In this construction, however, the flow rate is not limited except by the viscosity of the air before the air throttled by the orifice 3 reaches the outside through the gap 5. Accordingly, the pressure sharply drops in the gap 5 toward the outlet, and the rate of the load to a variation in dimension Cs of the gap 5 (which will hereinafter be referred to as the rigidity) and the maximum load (load capacity) are very low and such hydrostatic bearing cannot intactly be put into practical use.

FIG. 2 is a cross-sectional view of a hydrostatic bearing improved over the hydrostatic bearing pad of FIG. 1. The hydrostatic bearing pad 6 shown has an air admission port 7, an orifice 8 and a pocket 9. The air introduced into the admission port 7 and throttled at the inlet of the bearing pad 6 by the orifice 8 expands in the space or pocket 9 as indicated by arrows and displays the effect of having been throttled at the inlet. Accordingly, as compared with the hydrostatic bearing pad of FIG. 1, the hydrostatic bearing pad of FIG. 2 has an enhanced pressure retaining capability and increased rigidity. However, since the internal volume of the pocket is great, the air is liable to create an eddy when it expands in the pocket and this leads to a disadvantage that the hydrostatic bearing pad is liable to cause self-excited vibration and become unstable.

FIG. 3 shows an example in which air is throttled at the outlet of the hydrostatic bearing pad to further enhance the pressure retaining capability and increase the rigidity. In FIG. 3, the air having flowed into the admission port 11 of the hydrostatic bearing pad 10 causes a pressure substantially equal to the supply pressure of the air to act on the surface of the support member 4 over the entire area of a recess 12. This is because when the air in the recess passes through the gap 5 between the bearing pad 10 and the support member 4 (shown by arrows), it is throttled and by the effect of such outlet throttle, the pressure in the recess 12 is retained.

However, in the case of the bearing pad having such a construction, the pressurized air is supplied to the recess 12 without being limited and therefore, as the gap 5 becomes larger, the flow rate of the air is more and more increased and this leads to a disadvantage that the bearing pad becomes unstable and causes self-excited vibration.

In FIGS. 1–3 which illustrate the principle in a model-like fashion, the diameter of the orifice, the depth of the recess and the gap 5 between the bearing pad and the support member 4 are depicted on a larger scale than they actually are. Actually, the diameter of the orifice is less than one millimeter and the depth of the recess and the dimension Cs of the gap are of the order of several μm.

In view of the disadvantages peculiar to these conventional hydrostatic bearings, the inventor invented a hydrostatic bearing which was designed to ensure stable support of a load and smooth operation by enhancing the rate of the load to a variation in dimension of the gap, namely, the rigidity, and limiting the inflow rate and eliminating the pocket which was liable to cause eddy, thereby eliminating harmful self-excited vibration, and filed U.S. application Ser. No. 952,980, U.S. Pat. No. 4,226,483 covering such invention.

Such prior invention is a hydrostatic bearing constructed in the form of a pad or a flat shaft and which comprises an admission port for introducing a fluid, an orifice for throttling the flow rate of the fluid at the inlet and a recess provided in face-to-face relationship with a support member opposed to the bearing, the depth of the recess being made substantially equal to the dimension of the gap between the hydrostatic bearing and the support member, and wherein the fluid is throttled at the outlet of the bearing by the end portions of the recess.

This prior invention will hereinafter be described with reference to the drawings.

FIG. 4 is a cross-sectional view of a hydrostatic bearing pad illustrating the principle of the prior invention. In FIG. 4, air pressurized to any desired pressure higher than the atmospheric pressure is supplied to an admission port 31 by unshown supply means such as a pipe led from a compressor. Then, the air is throttled at the inlet by an orifice 14 (as indicated by solid lines), so that the flow rate thereof is limited. When the diameter of the bearing pad is 50 mm, the diameter of the orifice 14 should preferably be 0.5 mm or less, and the air reaches a recess 15 through this orifice 14. The depth of this recess 15 is set to a value substantially equal to the dimension Cs of the gap 5, and usually is of the order of several μm. By so constructing the hydrostatic bearing, the air is throttled at the end portions 16a of the recess, as indicated by dotted arrows, to create the effect of outlet throttle.

In FIG. 4, let Cs be the dimension of the gap 5, $C_R$ be the distance from the surface of the support member 4 to the bottom of the recess 15, Di be the diameter of the orifice 14, Ds be the diameter of the recess 15, and Da be the diameter of the hydrostatic bearing pad. Where the ratio between the dimension Cs of the gap 5 and the distance $C_R$ to the bottom of the recess 14 is $\beta = Cs/C_R$, it has been ascertained that when $\beta$ is set to $\beta = 0.2-0.7$, the most efficient outlet throttle effect is obtained. Incidentally, when the dimension Cs of the gap 5 is equal to the depth of the recess, $\beta = 0.5$. It is considered that the greater the diameter Ds of the recess, the higher the pressure retaining capability of the bearing pad 16, but the diameter of the recess should preferably be set in relation to the diameter of the orifice for the inlet throttle and, when the ratio between these diameters is $\lambda = \ln(Da/Ds)/\ln(Ds/Di)$, it is desirable that $\lambda = 0.02-0.06$. Although it has been stated above that the diameter Di of the orifice 13 should preferably be 0.5 mm or less, when the proportion thereof is taken into account in relation to the diameter Da of the bearing pad 16, it has been ascertained that $0.001 \leq \alpha (=Di/Da) \leq 0.01$ is an optimal value.

FIG. 5 is a perspective view of the hydrostatic bearing pad. In FIG. 5, reference numeral 18 designates an admission port, reference numeral 19 denotes an orifice, and reference numeral 20 designates a recess provided in face-to-face relationship with the support member (not shown). Reference numeral 21 denotes mounting screw holes.

FIG. 6 shows an embodiment of the slide device on which the above-described hydrostatic bearing pad is mounted. This is an example of the restraint type device in which a slider 22 is designed to cover a guide (support member) 23 and hydrostatic bearing pads $24_1$, $24_2$ and $24_3$ are attached to the slider 22 to permit sliding movement of the slider with a non-contact relationship established between the slider and the guide. The bearing pads receive pressurized air from an air supply hole 25 provided in the slider and inject the air to the guide 23 to thereby create a floating force.

FIG. 7 illustrates a restraint type slide device having the construction as shown in FIG. 6. A slider 27 surrounds a guide (support member) 26, and hydrostatic bearing pads 28 are attached to the surfaces of the slider 27 which are opposed to the guide 26. In FIG. 7, a load F is applied from above as indicated by an arrow. Designated by $28_1$ and $28_2$ are the bearing pads provided on the load side, and designated by $28_3$ and $28_4$ are the bearing pads provided on the non-load side. Designated by $28_5$ and $28_6$ are the bearing pads which are not directly related to the load but are provided to ensure stable sliding movement.

FIGS. 8 and 9 show the result of measurement of the load characteristics and pressure distributions of the bearing pad which throttles the fluid as shown in FIG. 1 only at the inlet, the bearing pad which throttles the fluid as shown in FIG. 3 only at the outlet, and the bearing pad which throttles the fluid of the present invention both at the inlet and the outlet, all by the use of the device having the above-described construction. The appellations of the dimensions of the various portions of the bearings pads of FIGS. 1 and 3 are the same as those in the case of FIG. 6 (for example, the diameter of the orifice is Di) and to conform the measuring conditions to each other, the diameter Da of the bearing pads has been set to Da=50 mm, the dimension Cs of the gap has been set to Cs=5 $\mu$m, and the pressure Po of the supplied air has been set to 5 atmospheric pressure.

FIG. 8 is a graph illustrating the displacement-load characteristic in which the ordinate represents the load $F/(\pi Da^2 Po/4)$ and the abscissa represents the displacement ratio $\epsilon s = \Delta h/Cs$ of the minute displacement $\Delta h$ of the gap to the dimension Cs of the set gap. This graph shows that where use is made of the inlet and outlet throttle bearing pad of the present invention, when the gap has become null (that is, $\Delta h = Cs$, $\epsilon s = 1$), as indicated by curve a, the bearing pad can withstand a load of about 53% of the whole supplied pressure. In the case of the outlet throttle pad of FIG. 3 as likewise indicated by curve b, it can only support a load of about 40% for $\epsilon s = 1.0$. Further, it is seen that where the inlet throttle bearing pad of FIG. 1 is used, it can hardly support the load as indicated by curve c. In other words, if the bearing pad of the present invention is used, the variation in dimension of the gap for the same load is small and the rigidity is enhanced, as compared with the outlet throttle bearing pad or the inlet throttle bearing pad. That is, if this is likened to a spring, there is obtained a spring of high elastic modulus which can always effect stable load support. In each bearing pad, the values of $\alpha$, $\beta$ and $\lambda$ have been set as follows:

(1) in the case of the inlet and outlet throttle bearing pad of the present invention, $\alpha = 0.004$, $\beta = 0.5$, $\lambda = 0.055$;

(2) in the case of the outlet throttle bearing pad of FIG. 3, $\alpha = 0.08$, $\beta = 0.5$, $\lambda = 0.055$; and (3) in the case of the inlet throttle bearing pad of FIG. 1, $\alpha = 0,004$, $\beta = 1$ (the depth of the recess=0).

FIG. 9 is a graph showing the pressure distributions of the above-described three bearing pads where the displacement ratio $\epsilon s$ in FIG. 8 is 0.8, namely, in the condition in which, for the set gap dimension, the dimension has been displaced by 80%. In this graph, the abscissa represents the ratio of the distance D/2 from the center of the bearing pad to the peripheral end thereof to the radius Da/2 of the circular bearing pad, and the ordinate represents the ratio P/Po of the pressure P at the distance D/2 point to the supplied pressure Po. In FIG. 9, curves indicated by solid lines represent the load side pad curve $a_1$ and the non-load side pad curve $a_2$ of the inlet and outlet throttle bearing pad. Likewise, curves $b_1$ and $b_2$ indicated by dotted lines refer to the outlet throttle bearing pad as shown in FIG. 3, and the curve $b_1$ represents the load side pad curve of such pad and the curve $b_2$ represents the non-load side pad curve thereof. Further, curves $c_1$ and $c_2$ indicated by dot-and-dash lines represent the load side pad curve and the non-load side pad curve of the inlet throttle bearing pad as shown in FIG. 1. As is apparent in FIG. 9, in the case of the inlet throttle bearing pad of FIG. 1, there is very little pressure difference between the load side pad $c_1$ and the non-load side pad $c_2$ and it cannot support the load as indicated by c in FIG. 8. In the bearing pad of the prior invention and the outlet throttle bearing pad of FIG. 3, the values of the pressure ratios at the load side are substantially the same. However, at the non-load side, the bearing pad of the prior invention is remarkable reduced in pressure ratio as compared with the outlet throttle bearing pad. Particularly, even immediately beneath the orifice, the pressure ratio is only 0.7. This seems to be attributable to the fact that when a load acts, the gap of the non-load side pad is widened as compared with the depth of the recess and moreover, the flow rate of the air is limited by the inlet throttle and therefore, the air can be injected from the widened gap to reduce the pressure at the non-load side. Accordingly, where such a restraint type construction is adopted, the pressure difference between the load side pad and the non-load side pad provides a force which supports the load and therefore, in the case of the inlet and outlet throttle bearing pad according to the prior invention, the area A indicated with solid-line hatching provides a pressure difference which creates a supporting force, whereas in the case of the outlet throttle bearing pad, there is created a supporting force only in the area B indicated with dotted-line hatching. In this case, to render the conditions constant, the value of $\lambda$ is set to 0.055 in both bearing pads.

Further, in the prior invention, pressure retention is effected by throttling the air at the outlet and as regards the inlet throttle, only the limitation of the flow rate is effected. Accordingly, the bearing pad of the prior invention is different in construction and operation from the bearing pad as shown in FIG. 3 wherein a pocket is provided so that the pressure is retained by the effect of the inlet throttle. That is, in order to cause the air to expand as a pocket and thereby retain the pressure, it is necessary to provide a great internal volume and for this purpose, the depth of the pocket must be at least several hundreds of $\mu$m. This shows that there is a difference as great as one hundred times as compared with the gap of several $\mu$m set between the bearing pad and the support member. Accordingly, the amount of air in the pocket is hardly fluctuated by a minute variation in the gap, unlike the air in the recess of the bearing pad according to the prior invention. That is, the pocket has not the outlet throttle effect but only has the inlet throttle effect and therefore, even in a case where such bearing pad is installed at the load side or at the non-load side, pressure drop curves similar to the curves $c_1$ and $c_2$ in FIG. 9 will be depicted and no sufficient pressure difference could be created. Also, as already noted, the expansion of the air in the pocket is liable to cause self-excited vibration and in the prior invention, there is provided no pocket having such an internal volume as to cause expansion and eddy of the air. Thus, there is no possibility of causing self-excited vibration, and therefore stable load support and slide operation become possible.

In the foregoing description, there has been shown an example of the restraint type slide mechanism in which hydrostatic bearing pads are attached to a slider, whereas the bearing pads may also be attached to the guide (support member) side or a portion of the slider or the guide may be machined into the construction as described above. Further, even when the hydrostatic bearing pads are used in a float-up type mechanism wherein a slider having the load side bearing pad alone is designed to float-up from the guide, the flow rate is limited by the inlet throttle effect to suppress the amount of float-up, thereby enabling stable support without causing self-excited vibration.

Further, in the foregoing description, a case where air is used as the fluid has been taken as an example, but even if non-compressive fluid such as oil or the like is used with the prior invention, it is of course possible to enhance the rigidity and ensure stable operation.

The prior invention creates the combined effect of inlet throttle and outlet throttle by adopting the above-described construction and provides a higher rigidity than the conventional hydrostatic bearings and can withstand a heavier load. Moreover, the fluctuation rate of the gap is small and the fluid never forms eddy and therefore, self-excited vibration is not liable to occur, thus enabling stable operation.

SUMMARY OF THE INVENTION

The present invention relates to improvement over the above-described prior invention. The improvement lies in that the number of air supply holes has been increased to further increase the load capacity and rigidity.

The invention will become more fully apparent from the following description thereof taken in conjunction with the accompanying drawings.

DESCRIPTION OF THE PREFERRED EMBODIMENTS

The invention will hereinafter be described with reference to FIG. 10 and so on.

Figure 4:
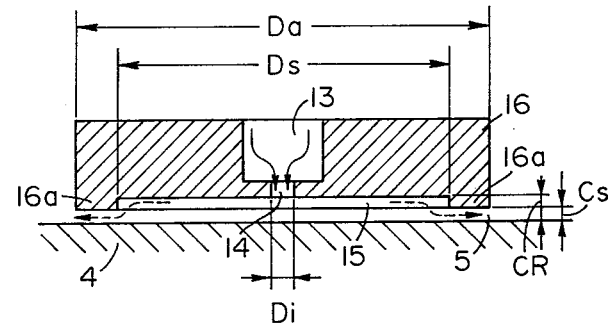
FIG. 4 is a cross-sectional view of an inlet and outlet throttle type hydrostatic bearing according to the prior invention.
Figure 5:
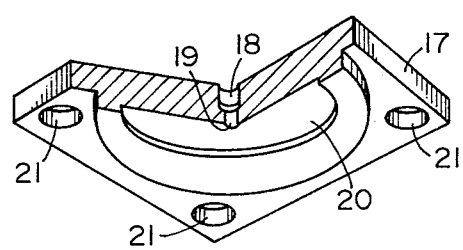
FIG. 5 is a perspective view showing an embodiment of the hydrostatic bearing according to the prior invention.
Figure 6:
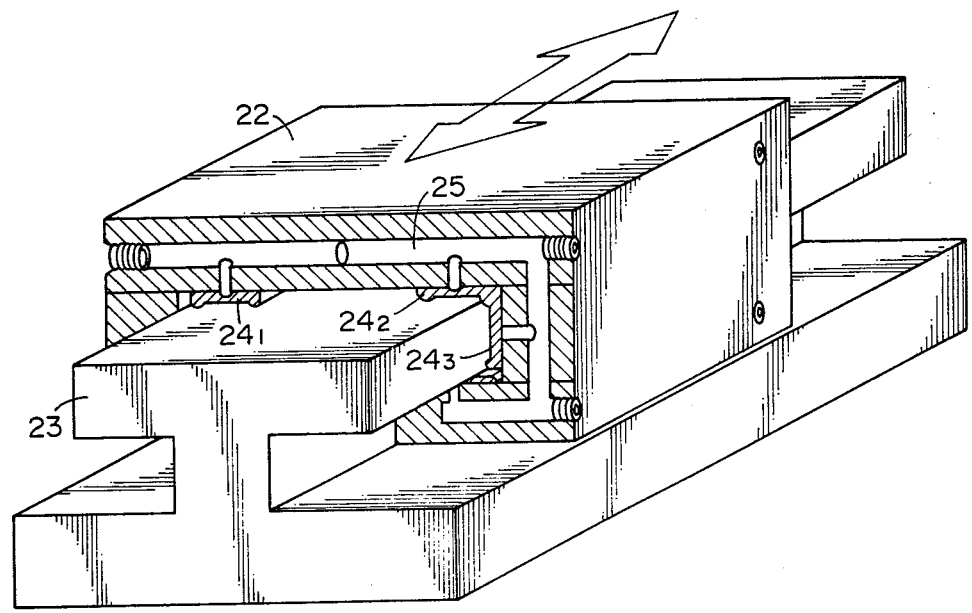
FIG. 6 is a cross-sectional view of a slide device.
Figure 7:
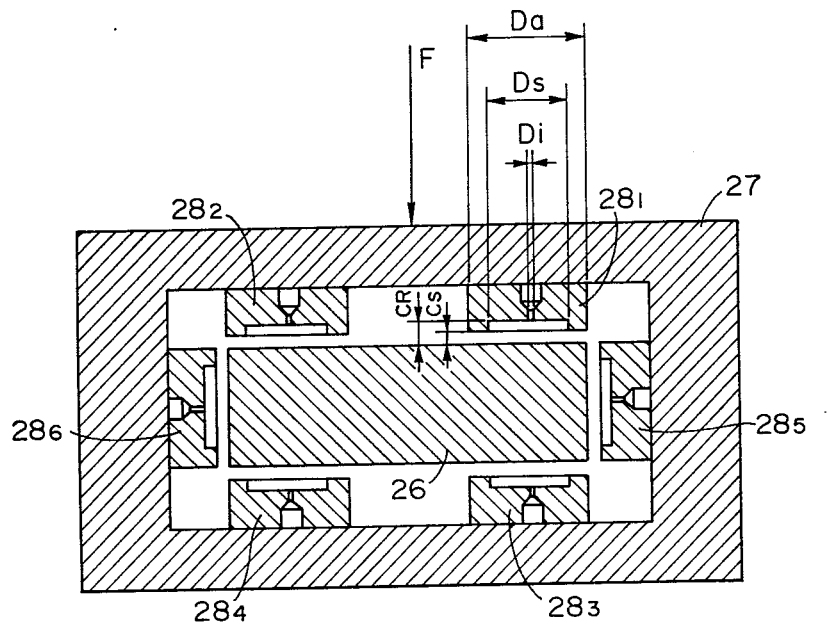
FIG. 7 illustrates a restraint type slide device.
Figure 8:
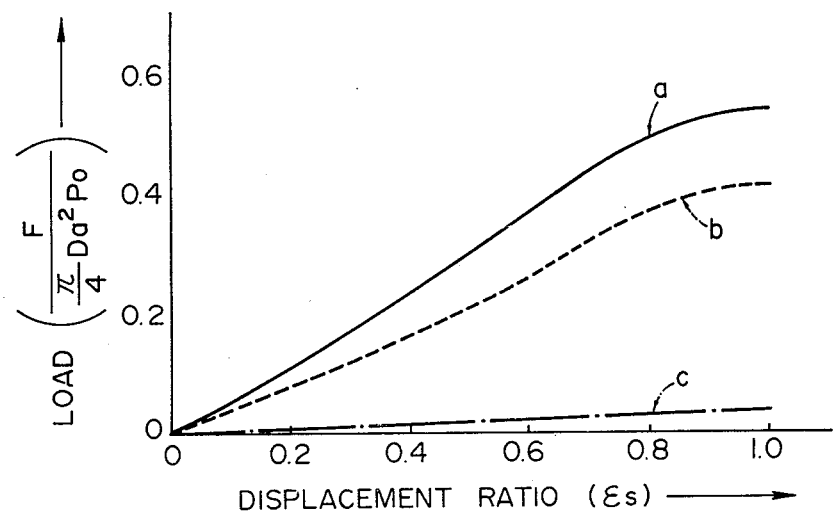
FIG. 8 is a graph illustrating the displacement-load characteristic of the hydrostatic bearing.
Figure 9:
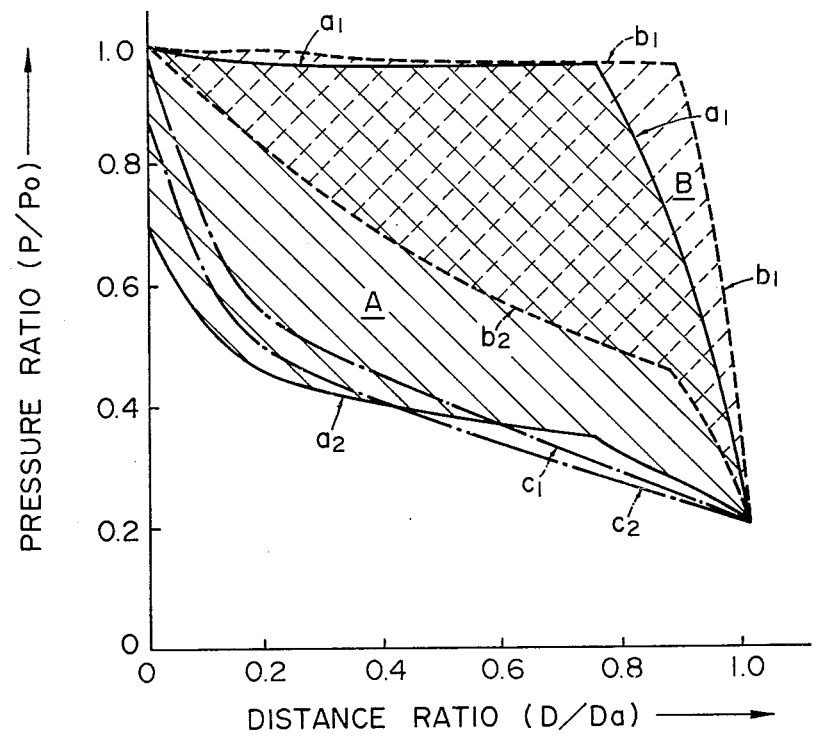
FIG. 9 is a graph illustrating the pressure distribution.
Figure 10:
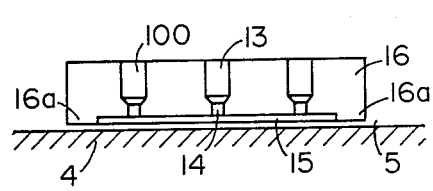
FIG. 10 is a cross-sectional view of the hydrostatic bearing of the present invention.
Figure 11:
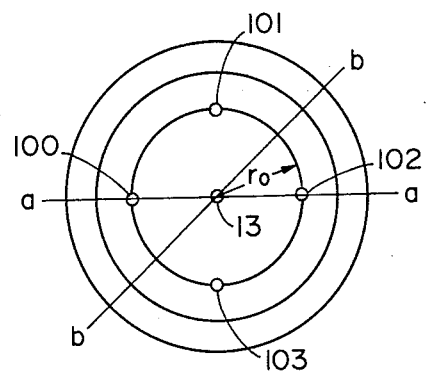
FIG. 11 is a bottom plan view of the FIG. 10 bearing.
Figure 12:
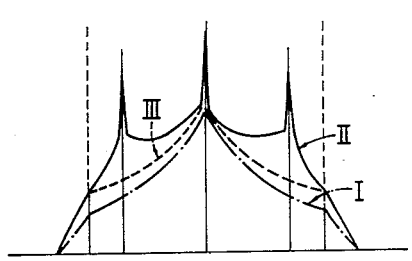
FIG. 12 illustrates the pressure distribution in the bearing of FIG. 10.

FIG. 10 is a cross-sectional view of the hydrostatic bearing H of the present invention. This Figure is substantially similar to FIG. 4, but as shown in FIG. 11, this bearing has, in addition to a central air supply hole 13, four peripheral air supply holes 100–103 disposed on a circumference $\gamma_0$ centered at the central air supply hole 13 and spaced apart from one another by an equal angle. These peripheral air supply holes 100–103 are not limited to four, but may be four or more. By so providing the peripheral air supply holes 100–103, there is obtained a hydrostatic bearing in which, as shown in FIG. 12, as compared with the bearing internal pressure distribution line (I) of FIG. 4, the entire pressure is increased as indicated by the distribution line (II) on the cross-section a—a and the pressure distribution line (III) on the cross-section b—b, to thereby improve the load capacity and rigidity.

Figure 13:
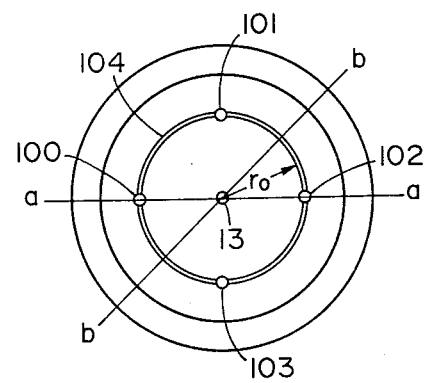
FIG. 13 shows a second embodiment of the present invention.
Figure 14:
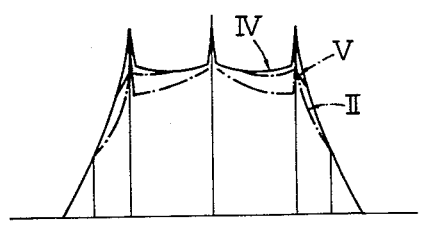
FIG. 14 illustrates the pressure distribution in the second embodiment.
Figure 15:
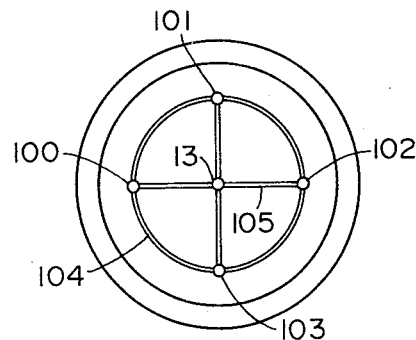
FIG. 15 shows a third embodiment of the present invention.

FIG. 13 shows a second embodiment of the present invention. In this embodiment, peripheral air supply holes 100-103 are connected together by a circumferential groove 104 centered at the air supply hole 13. This groove may be of any shape such as V-shape, U-shape or circular shape. However, the groove width (W) x depth b should desirable be 0.01-0.03×0.01-0.03. By providing this groove 104, the bearing internal pressure distribution is made more symmetrical about an axis. Such condition is shown in FIG. 14, wherein IV indicates the pressure distribution on the cross-section a—a of FIG. 13 and V indicates the pressure distribution on the cross-section b—b. FIG. 15 shows a third embodiment in which grooves 105 connect the central air supply hole 13 and the peripheral air supply holes 100-103. By this, the symmetry about an axis is further increase the load capacity and rigidity.

What I claim is:

1. A hydrostatic bearing, comprising:
   a first member;
   a second member having a surface opposed to a surface of said first member, said first and second members being movable relative to each other;
   a protuberance formed at an outer peripheral portion of said first member, said protuberance and said opposing surfaces of said first and second members defining a recess therebetween; and
   means, in communication with the recess, defining a plurality of holes for supplying high pressure gas to the recess,
   wherein when pressurized gas is supplied to the recess the following relationships are satisfied:
   $\lambda$ is in the range of 0.02 to 0.06;
   $\alpha$ is in the range of 0.001 to 0.01; and
   $\beta$ is in the range of 0.2 to 0.7 where
   $\lambda = (\ln Da/Ds)/(\ln Ds/Di)$
   $\alpha = Di/Da$
   $\beta = Cs/Cr$
   with Da being the diameter of said first member, Ds being the diameter of the recess, Di being the diameter of each of said plurality of holes, Cs being the gap formed between said surface of said second member and said protuberance and Cr being said gap formed between said surface of said second member and the surface of said first member.

2. A hydrostatic bearing according to claim 1, wherein said plurality of holes includes a central hole disposed in alignment with the centermost portion of the recess, and four peripheral holes disposed on a circumference centered at said central hole and spaced apart from each other by an equal amount.

* * * * *

UNITED STATES PATENT AND TRADEMARK OFFICE
CERTIFICATE OF CORRECTION

PATENT NO. : 4,448,460
DATED : May 15, 1984
INVENTOR(S) : HIRONORI YAMAMOTO

Figure 1:
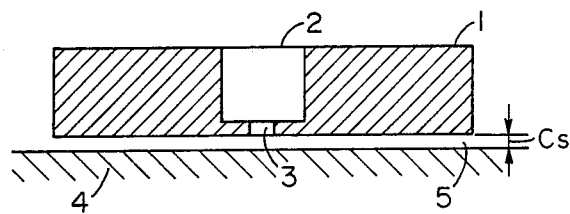
FIG. 1 is a cross-sectional view of an inlet throttle type hydrostatic bearing.
Figure 2:
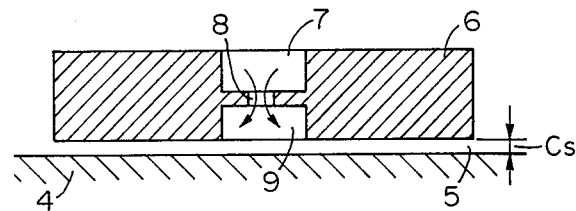
FIG. 2 is a cross-sectional view of an inlet throttle type hydrostatic bearing having a pocket.
Figure 3:
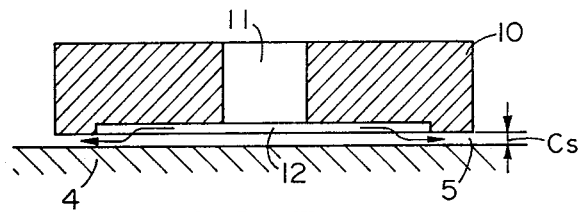
FIG. 3 is a cross-sectional view of an outlet throttle type hydrostatic bearing.

It is certified that error appears in the above-identified patent and that said Letters Patent is hereby corrected as shown below:

Column 1, line 23, between "in" and "they" insert --that--; after "and" delete "that".
         line 32, --Figs. 1 to 3-- should begin a new paragraph.

Column 2, line 58, "31" should read --13--.

Column 4, line 34, "0,004" should read --0.004--;
         line 64, "remarkable" should read --remarkably--.

Column 6, line 51, "FIG." should read --FIGS.--.

Column 7, line 7, "desirable" should read --desirably--;
         line 17, "is further increase" should read --is further increased--.

Signed and Sealed this

Twenty-seventh Day of November 1984

[SEAL]

Attest:

GERALD J. MOSSINGHOFF

Attesting Officer     Commissioner of Patents and Trademarks